US010142930B2

(12) United States Patent
Duan et al.

(10) Patent No.: US 10,142,930 B2
(45) Date of Patent: Nov. 27, 2018

(54) TERMINAL, WIRELESS NETWORK AND COMMUNICATION METHODS WITH LOW POWER CONSUMPTION

(71) Applicant: Huawei Technologies Co., Ltd., Shenzhen (CN)

(72) Inventors: Weiming Duan, Shanghai (CN); Miao Fu, Shenzhen (CN); Ming Fang, Shanghai (CN); Yanqiang Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 278 days.

(21) Appl. No.: 14/688,186

(22) Filed: Apr. 16, 2015

(65) Prior Publication Data

US 2015/0223167 A1  Aug. 6, 2015

Related U.S. Application Data

(63) Continuation of application No. PCT/CN2013/082831, filed on Sep. 3, 2013.

(30) Foreign Application Priority Data

Oct. 17, 2012 (CN) .......................... 2012 1 0395181

(51) Int. Cl.
*H04W 52/02* (2009.01)
*H04W 74/00* (2009.01)
*H04W 4/70* (2018.01)

(52) U.S. Cl.
CPC ......... *H04W 52/0212* (2013.01); *H04W 4/70* (2018.02); *H04W 52/0209* (2013.01);
(Continued)

(58) Field of Classification Search
CPC ............. H04W 52/0212; H04W 4/005; H04W 52/0225; H04W 74/004;
(Continued)

(56) References Cited

U.S. PATENT DOCUMENTS

2005/0037771 A1  2/2005  Tiedemann, Jr. et al.
2005/0281216 A1  12/2005  Varonen et al.
(Continued)

FOREIGN PATENT DOCUMENTS

CN  102164421 A  8/2011
CN  102378376 A  3/2012
(Continued)

OTHER PUBLICATIONS

"3rd Generation Partnership Project; Technical Specification Group Core Network; Mobile Radio Interface Layer 3 Specification (Release 1998)," 3GPP TS 04.08 V7.21.0, Dec. 2013, 624 pages.
(Continued)

*Primary Examiner* — Pao Sinkantarakorn
(74) *Attorney, Agent, or Firm* — Slater Matsil, LLP

(57) ABSTRACT

Embodiments of the present invention provide a communication method of an MTC terminal with low power consumption, which includes: sending, by the MTC terminal, a wireless channel request message to a base station through a random access channel; receiving, by the MTC terminal, an immediate assignment message delivered by a wireless network; and sending, by the MTC terminal, an MTC data report message to the wireless network, where the MTC data report message includes a unique identifier of the MTC terminal, authentication information and service data. The embodiments of the present invention further provide an MTC terminal with low power consumption, and a communication method and system of a wireless network with low power consumption, which can reduce power consumption
(Continued)

of a wireless terminal during communication, so that the MTC terminal can maintain communication for a longer period of time.

17 Claims, 14 Drawing Sheets

(52) U.S. Cl.
CPC ....... *H04W 74/002* (2013.01); *H04W 74/004* (2013.01); *H04W 52/0225* (2013.01); *Y02D 70/1222* (2018.01); *Y02D 70/1224* (2018.01); *Y02D 70/1226* (2018.01); *Y02D 70/21* (2018.01)

(58) Field of Classification Search
CPC ............. H04W 72/04–72/042; H04W 74/002–74/008; H04W 74/0833; Y02B 60/50; Y02D 70/21
USPC ......................................................... 370/311
See application file for complete search history.

(56) References Cited

U.S. PATENT DOCUMENTS

| | | | | |
|---|---|---|---|---|
| 2010/0019887 | A1* | 1/2010 | Bridgelall | H04Q 9/00 340/10.2 |
| 2011/0264740 | A1 | 10/2011 | Diachina et al. | |
| 2012/0127951 | A1 | 5/2012 | Dhanda et al. | |
| 2012/0163311 | A1* | 6/2012 | Park | H04W 72/1294 370/329 |
| 2012/0322440 | A1* | 12/2012 | Jeong | H04W 4/005 455/425 |
| 2013/0083728 | A1* | 4/2013 | Park | H04W 68/005 370/328 |
| 2013/0163502 | A1 | 6/2013 | Fang et al. | |
| 2013/0316700 | A1* | 11/2013 | Beale | H04W 72/082 455/423 |
| 2013/0336301 | A1 | 12/2013 | Deng et al. | |

FOREIGN PATENT DOCUMENTS

| | | |
|---|---|---|
| CN | 102647801 A | 8/2012 |
| CN | 102655666 A | 9/2012 |
| RU | 2364056 C2 | 8/2009 |
| WO | 2012131654 A1 | 10/2012 |

OTHER PUBLICATIONS

"3rd Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) Protocol (Release 11)," 3GPP TS 44.060 V11.2.1, Sep. 2012, 627 pages.

"3rd Generation Partnership Project; Technical Specification Group Services and System Aspects; System improvements for Machine-Type Communications (MTC) (Release 11)," 3GPP TR 23.888 V11.0.0, Sep. 2012, 165 pages.

"3rd Generation Partnership Project; Technical Specification Group Services and System Aspects; Service requirements for Machine-Type Communications (MTC); Stage 1 (Release 12)," 3GPP TS 22.368 V12.0.0, Sep. 2012, 25 pages.

"Does the Short Access TBF Merit Revisiting for GEMDA?," 3GPP TSG GERAN#51, Göteborg, Sweden, 29th Aug. 29-Sep. 2, 2011, Nokia Siemens Networks, Tdoc GP-111262, Agenda Item 6.4, 3 pages.

"Short Access Removal," Change Request, 3GPP TSG-GERAN Meeting #19, Cancun Mexico, Apr. 19-23, 2004, Tdoc GP-041072, 44.060 CR 502, Revision 1, Current Version 4.f.0, Melco Mobile Communication Europe, 5 pages.

\* cited by examiner

TERMINAL, WIRELESS NETWORK AND COMMUNICATION METHODS WITH LOW POWER CONSUMPTION

This application is a continuation of International Application No. PCT/CN2013/082831, filed on Sep. 3, 2013, which claims priority to Chinese Patent Application No. 201210395181.3, filed on Oct. 17, 2012, both of which are hereby incorporated by reference in their entireties.

TECHNICAL FIELD

The present invention relates to a terminal, a wireless network and communication methods with low power consumption, and in particular, to a terminal, a wireless network and methods applicable to machine type communication.

BACKGROUND

Machine type communication (MTC) has been discussed in the 3GPP standard. For MTC applications of certain types, a terminal with ultra-low power consumption and a corresponding communication method are crucial.

In the current society, there is such a need, for example, for a children mobile phone, to inquire the location of a child. However, in case of emergency, the mobile phone may not always be recharged in time after running out of battery. Therefore, in this case a terminal with ultra-low power consumption is needed to periodically notify (or to be triggered to notify) a wireless network and it can work for a very long time to transfer key information, such as a specific location or "I am alive". By using such a communication method, the wireless network can track the status of the terminal for a long time.

The challenge to MTC terminals of this type is to have a battery life that is several years long. For reference, the longest standby time of an existing terminal is just several months.

Power consumption of a terminal may be divided into several parts:

power consumption of the terminal in an idle state, which is determined by a power saving technology of the terminal, for example, design of a chip with an ultra-low leakage current;

power consumption of the terminal to synchronize and obtain information broadcast by a cell;

power consumption of the terminal to intercept common control channel information (for example, paging information or scheduling information);

power consumption of the terminal to transmit uplink data; and power consumption of the terminal to receive downlink data.

FIG. 1A and FIG. 1B depict a process of GPRS (General Packet Radio Service) data transmission. As can be seen from FIG. 1A and FIG. 1B. This process includes transmission of lots of uplink signaling data and reception of lots of downlink signaling data. If an existing communication method is used, the longest battery life of the MTC terminal will not be more than half a year, and it is very difficult to further reduce power consumption of the MTC terminal.

SUMMARY

Embodiments of the present invention provide a communication method of an MTC terminal with low power consumption, an MTC terminal with low power consumption, a communication method of a wireless network with low power consumption, and a communication system of a wireless network with low power consumption, which can reduce power consumption of a wireless terminal during communication, so that the MTC terminal can maintain communication within a longer period of time.

To achieve the forgoing objectives, the embodiments of the present invention adopts the following technical solutions:

An embodiment of the present invention provides a communication method of an MTC terminal with low power consumption, including: sending, by the MTC terminal, a wireless channel request message to a base station through a random access channel; receiving, by the MTC terminal, an immediate assignment message delivered by a wireless network; and sending, by the MTC terminal, an MTC data report message to the wireless network, where the MTC data report message includes a unique identifier of the MTC terminal, authentication information and service data.

An embodiment of the present invention provides an MTC terminal with low power consumption, including: a sending processing unit, configured to send a wireless channel request message to a base station BTS through a random access channel; and a reception processing unit, configured to receive an immediate assignment message delivered by a wireless network; where the sending processing unit is further configured to send an MTC data report message to the wireless network, where the MTC data report message includes a unique identifier of the MTC terminal, authentication information and service data.

An embodiment of the present invention provides a communication method of a wireless network with low power consumption, including: receiving, by the wireless network, a wireless channel request message, which is sent by an MTC terminal to a base station BTS through a random access channel; receiving and transparently transmitting, by the base station BTS, the wireless channel request message to a base station controller BSC, where the base station controller BSC allocates a data transmission resource to the MTC terminal, and notifies the MTC terminal by using an immediate assignment message; and receiving, by the wireless network, a data report message from the MTC terminal.

An embodiment of the present invention provides a communication system of a wireless network with low power consumption, including: a base station BTS, configured to receive a wireless channel request message, which is sent by an MTC terminal through a random access channel, where the base station BTS is further configured to receive and transparently transmit the channel request message to a base station controller BSC; the base station controller BSC, configured to allocate a data transmission resource to the MTC terminal, and notify the MTC terminal by using an immediate assignment message; and the wireless network, including the base station BTS and the base station controller BSC, and configured to receive an MTC data report message sent by the MTC terminal, where the message includes a unique identifier of the MTC terminal, authentication information and service data.

By using the communication method of an MTC terminal with low power consumption provided by the embodiment of the present invention, message connection can be maintained for a longer time at low power consumption, so that key data, such as a specific location or "I am alive," can be transferred for a long time.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other similar solutions from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

If an existing communication method is used, the longest battery life of the MTC terminal will not be more than half a year, and it is very difficult to further reduce power consumption of the MTC terminal. To support an MTC application of an "I am alive" type, a solution is needed to reduce MTC power consumption.

Figure 1A:
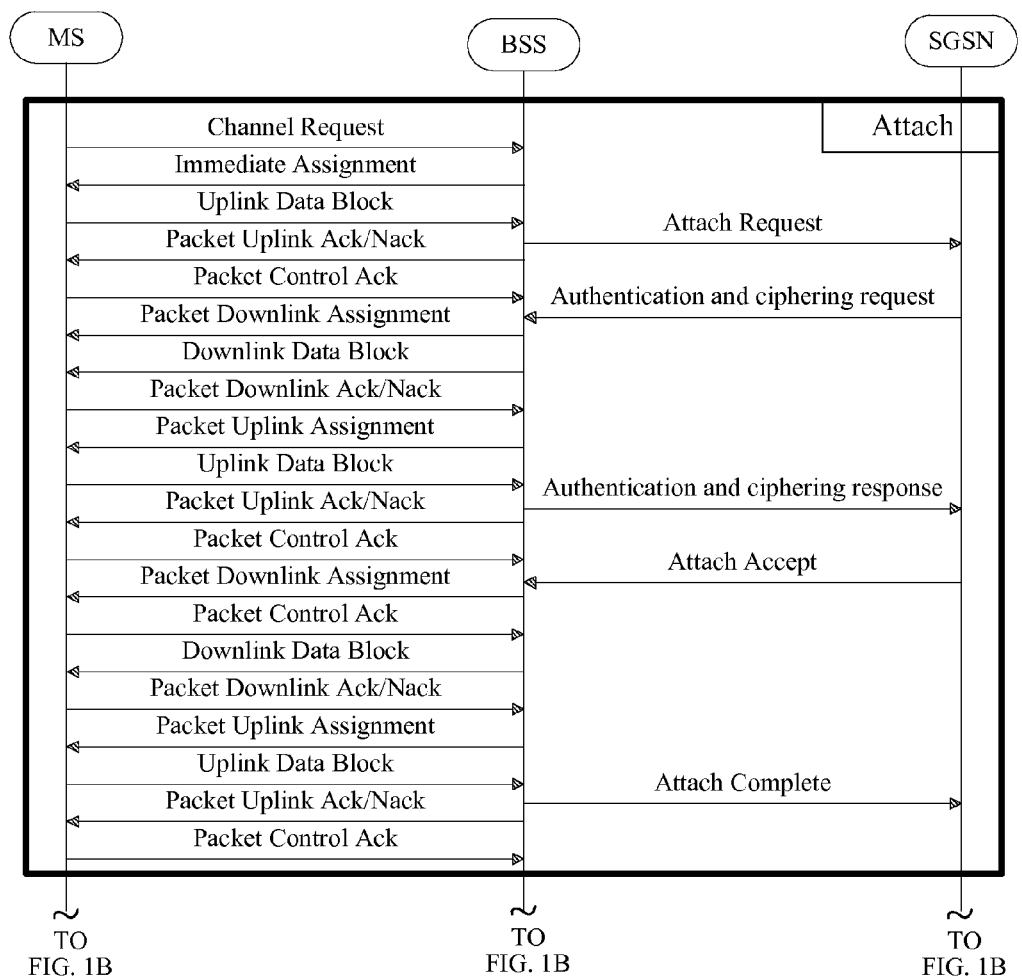
FIG. 1A and FIG. 1B are flow charts of GPRS (General Packet Radio Service) data transmission.
Figure 1B:
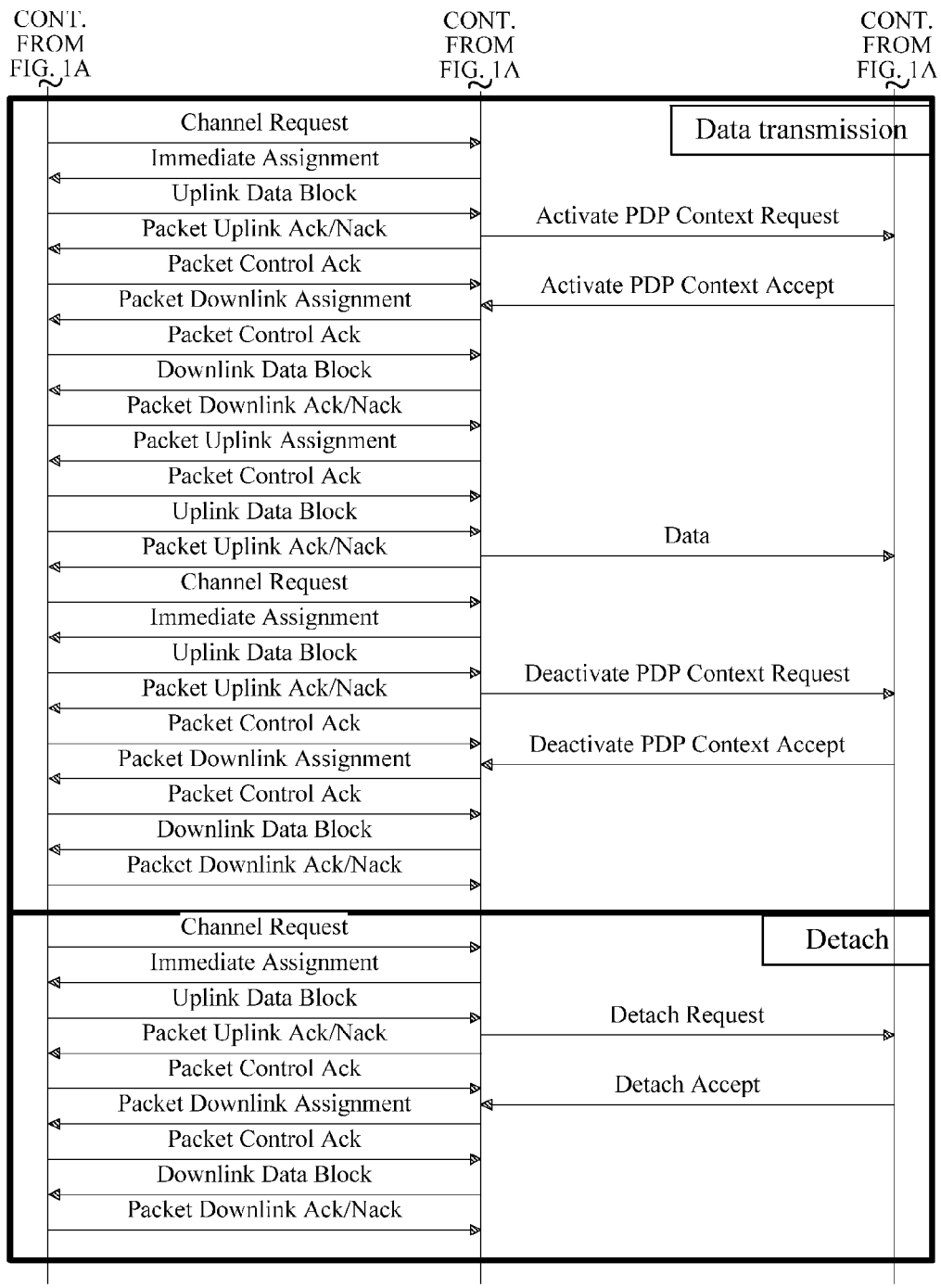
Figure 2:
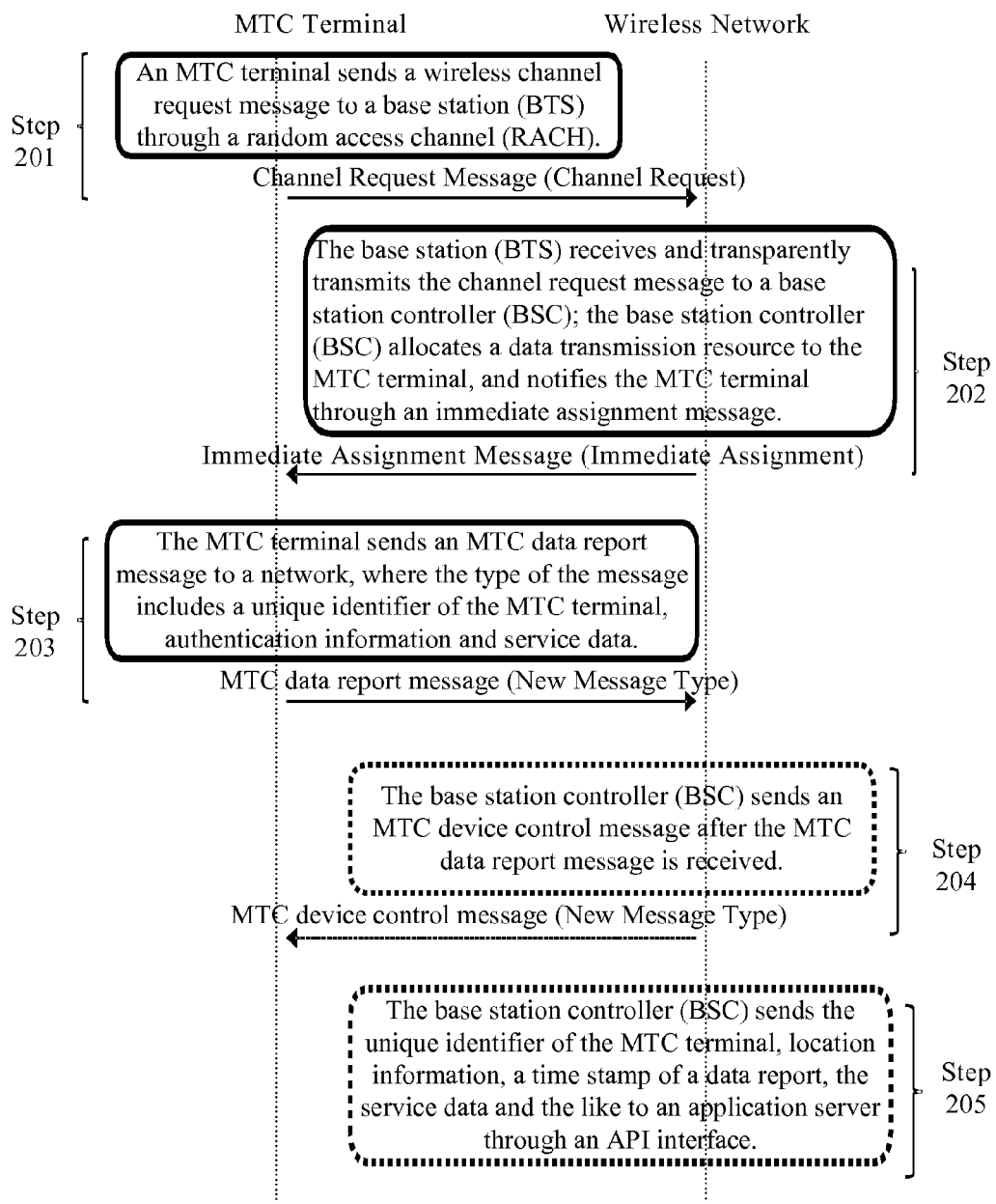
FIG. 2 is a flow chart of a communication method of an MTC terminal with low power consumption and a wireless network according to a first embodiment.

FIG. 2 shows a communication method of an MTC terminal with low power consumption and a wireless network according to a first embodiment of the present invention, which includes the following steps: The wireless network includes a base station (BTS) and a base station controller (BSC), and can provide wireless access and communication services.

Step 201: The MTC terminal sends a wireless channel request message to the base station (BTS) through a random access channel (RACH).

Step 202: The base station (BTS) receives and transparently transmits the channel request message to the base station controller (BSC); the base station controller (BSC) allocates a data transmission resource to the MTC terminal, and notifies the MTC terminal by using an immediate assignment message.

Step 203: The MTC terminal sends an MTC data report message to the wireless network, where the MTC data report message includes a unique identifier of the MTC terminal, authentication information and service data.

The unique identifier of the MTC terminal is a number, for example, a 32-bit or 64-bit binary number. The number occupies a variable bit width and is used for uniquely identifying the MTC terminal in the wireless network.

The authentication information is generated by the MTC terminal according to a current time stamp (generally accurate to minute) and a preset initial code by using a random number method. Correspondingly, at the base station controller (BSC), there is also an authentication system, which can verify the authentication information reported by the MTC terminal.

The service data may include particular data (which may be vital signs, depending on the type of the MTC terminal) obtained by the MTC terminal in real time. The MTC terminal may also obtain data through an external interface. The service data may also include wireless environment data detected by the MTC terminal, and the base station controller (BSC) can further accurately locate the MTC terminal according to the wireless environment data.

The MTC data report message may be obtained by extending an existing GSM/EDGE message structure, for example, by changing the value range of one information element therein. In the MTC data report message reported by the MTC terminal, there is a field reserved for the service data.

Preferably, the method further includes the following step: Step 204: After receiving the MTC data report message, the base station controller (BSC) sends an MTC device control message.

The MTC device control message may be obtained by extending an existing GSM/EDGE message structure, for example, by changing the value range of one information element therein. After receiving the MTC device control message, the MTC terminal may also feedback an acknowledgment message.

The MTC device control message sent by the wireless network to the MTC terminal includes a control instruction, for controlling behaviors of the terminal. The MTC terminal receives the MTC device control message, and performs a corresponding operation according to the control command in the MTC device control message, where the operation is, for example, changing a report period or stopping working after termination of service.

Preferably, the method further includes the following step: Step 205: The base station controller (BSC) sends the unique identifier of the MTC terminal, location information, a time stamp of a data report, and the service data to an application server through an application interface (API).

The application server is configured to manage information reported by the MTC terminal and provide a human-machine interface that can be operated by an administrator. The application server may exist independently or share a physical resource with another server.

Figure 3A:
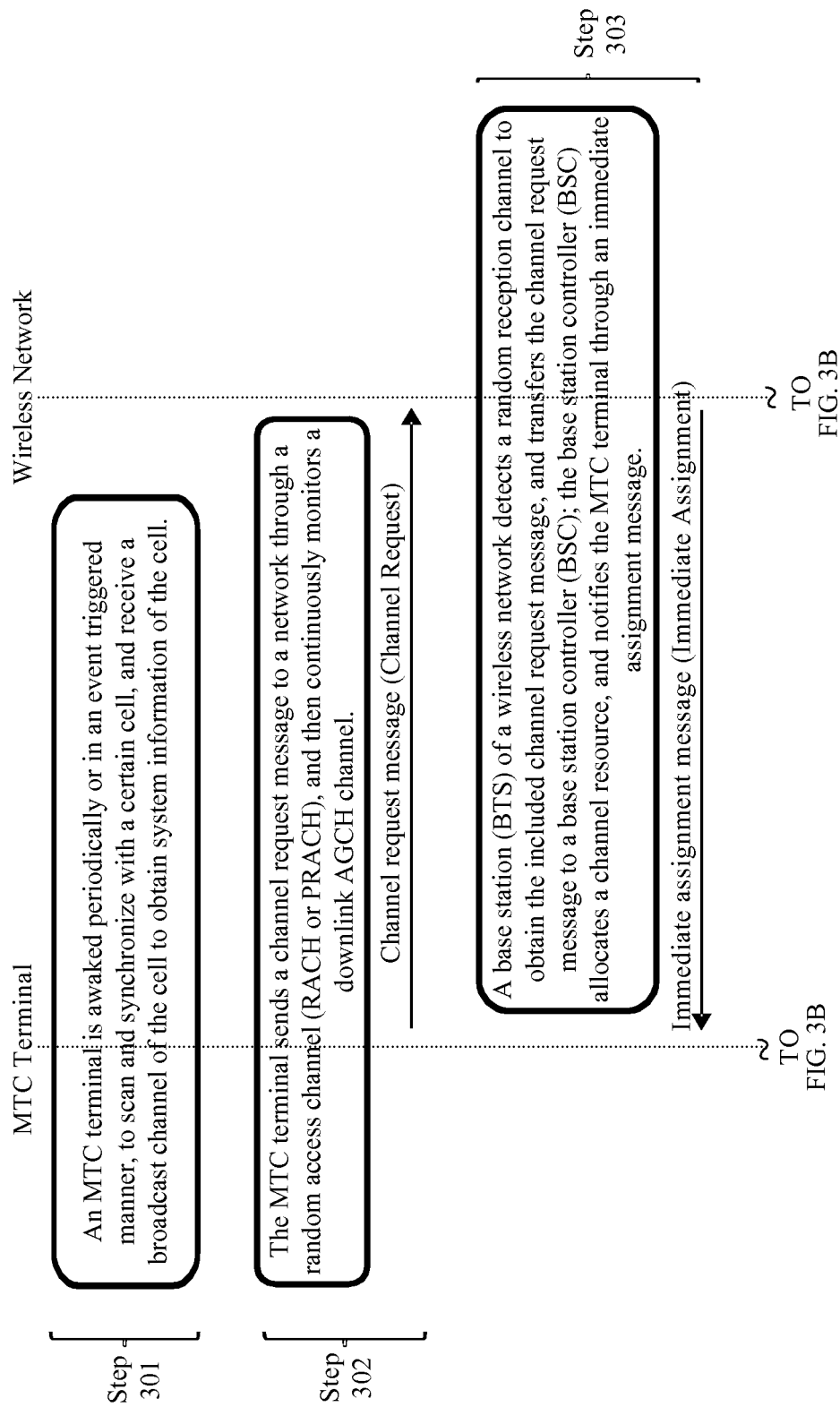
FIG. 3A and FIG. 3B are flow charts of a communication method according to a second embodiment.
Figure 3B:
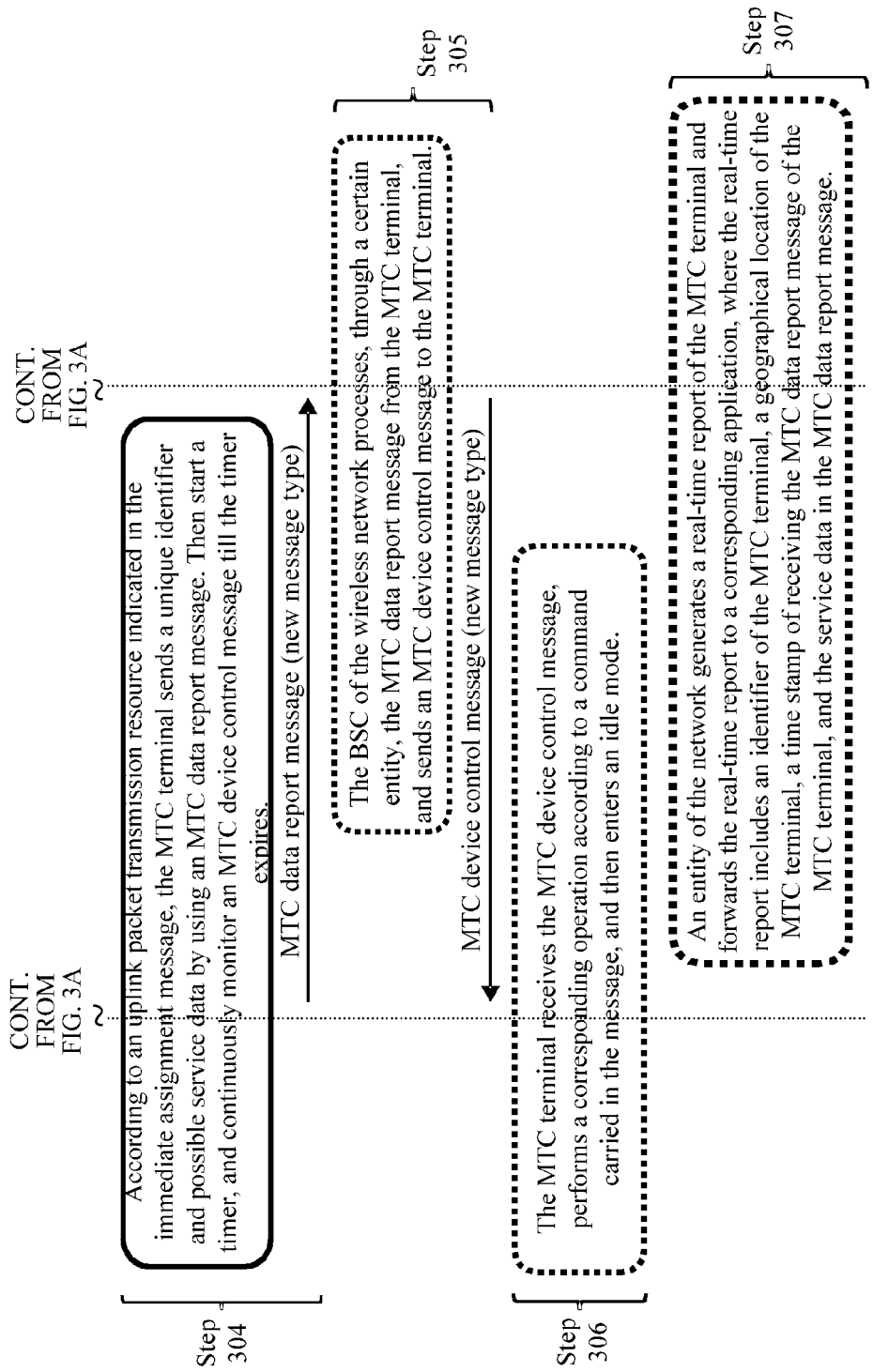

FIG. 3A and FIG. 3B show a communication method of an MTC terminal with low power consumption and a wireless network according to a second embodiment of the present invention, which includes the following steps:

Step 301: The MTC terminal is awaked periodically or in an event triggered manner, to scan and synchronize with a certain cell, and receive a broadcast channel of the cell to obtain system information of the cell.

Step 302: The MTC terminal sends a channel request message to a wireless network by using a random access channel (RACH), and continuously monitors a downlink AGCH channel, so as to receive an immediate assignment message (Immediate Assignment) sent by a base station controller.

Step 303: A base station (BTS) of the wireless network detects the random access channel to obtain the included channel request message, and transfers the channel request message to the base station controller (BSC); the base station controller (BSC) allocates a channel resource, and notifies the MTC terminal by using the immediate assignment message; and Step 304: According to an uplink packet transmission resource indicated in the immediate assignment message, the MTC terminal sends a unique identifier and possible service data by using an MTC data report message.

Preferably, the immediate assignment message may include an ID of the terminal, and authentication information. The ID of the terminal is a number, for example, a 32-bit or 64-bit binary number. The number occupies a variable bit width and is used for representing a terminal number of an M2M system.

The authentication information and the service data are similar to the authentication information and the service data in the first embodiment.

Preferably, this embodiment further includes step 305 and step 306.

Step 305: The BSC of the wireless network processes, by using a certain entity, the MTC data report message from the MTC terminal, and sends an MTC device control message to the MTC terminal.

Step 306: The MTC terminal receives the MTC device control message, and performs a corresponding operation according to a command carried in the message; and then the MTC terminal enters an idle mode.

Preferably, this embodiment further includes step 307.

Step 307: An entity of the wireless network generates a real-time report of the MTC terminal and forwards the real-time report to a related application, where the real-time report includes an identifier of the MTC terminal, a geographical location of the MTC terminal, a time stamp of receiving the MTC data report message from the MTC terminal, and the service data in the MTC data report message.

In order to prevent the MTC terminal from missing the device control message in step 305 and falling into a message waiting state, in step 304, a timer is started, and when the timer expires, the MTC terminal enters the idle mode and stops waiting.

To identify a legal call from the MTC terminal with low power consumption, a method for generating and using the foregoing authentication information is as follows:

the MTC terminal adds a dynamic random number to the service data, and sends the service data to the wireless network. The dynamic random number is automatically generated according to a current time (generally accurate to minute) and a preset initial code (a constant number bound with the MTC terminal).

When receiving real-time data of a particular MTC terminal, the wireless network generates another dynamic random number according to a current time (generally accurate to minute) and unique configuration of the MTC terminal. Afterwards, the wireless network compares the generated dynamic random number with the random number received from the particular MTC terminal, if the random numbers are the same, the MTC data report message obtained by the current call passes authentication.

Figure 4A:
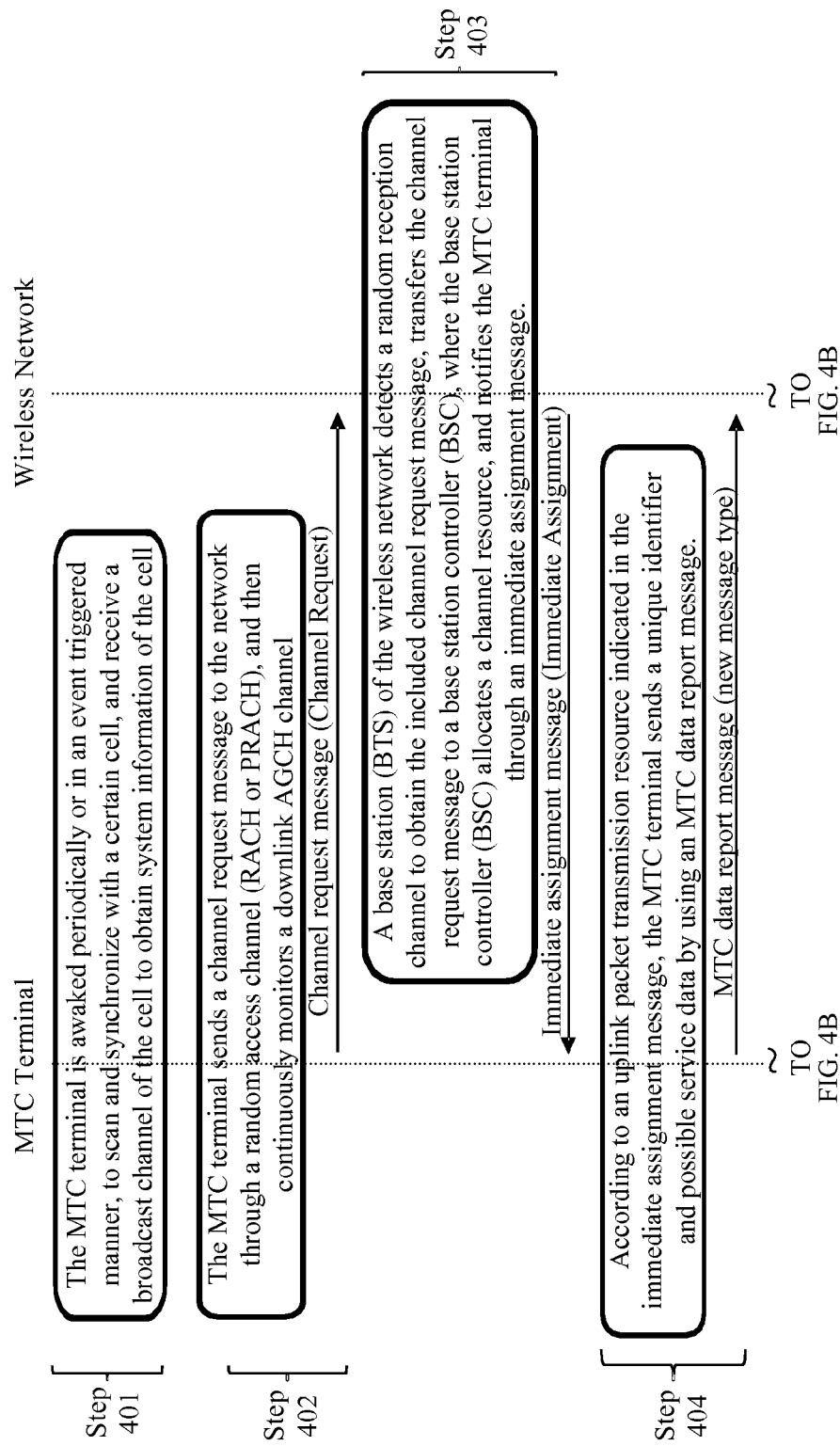
FIG. 4A and FIG. 4B are flow charts of a communication method according to a third embodiment.
Figure 4B:
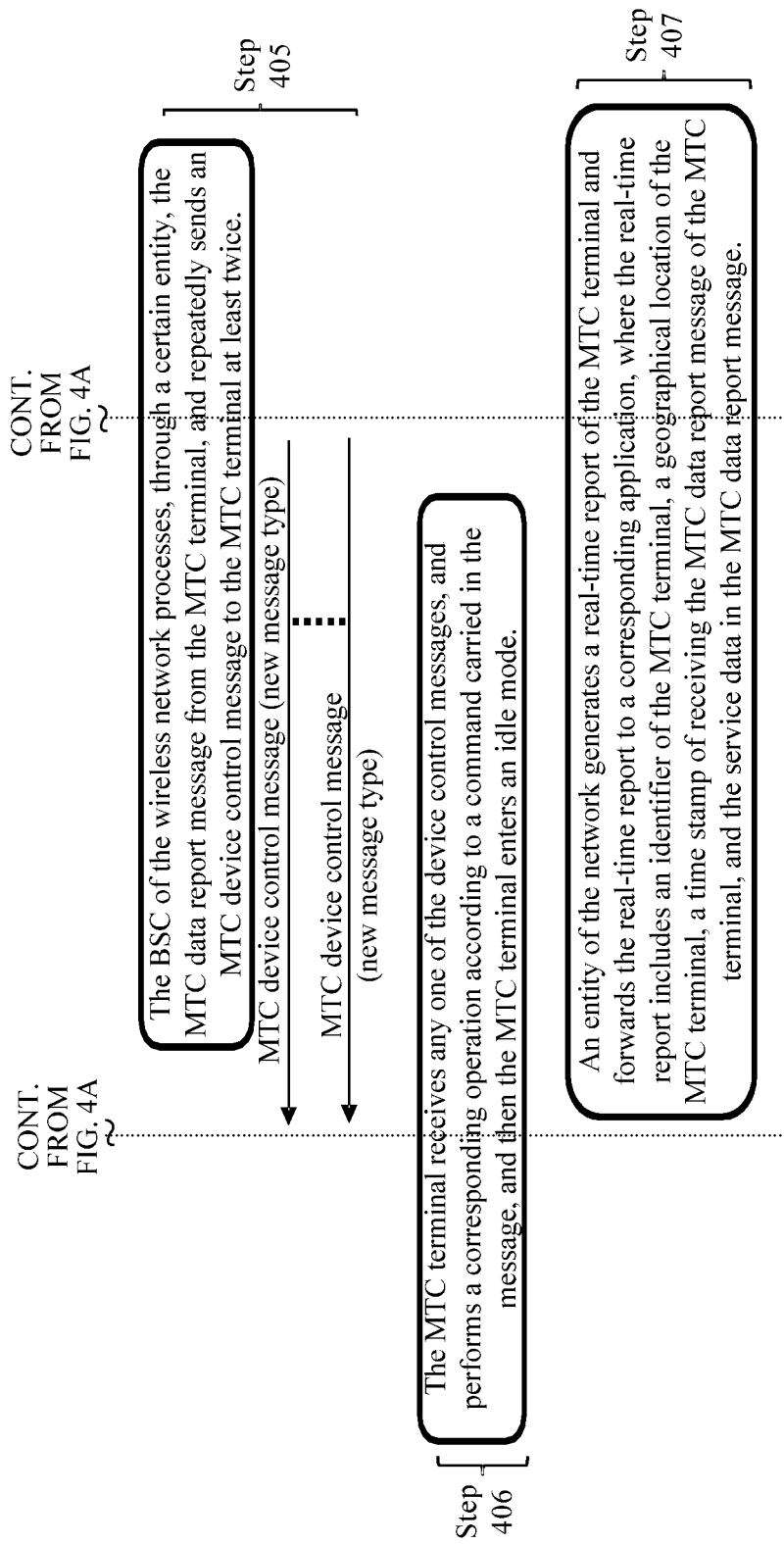

FIG. 4A and FIG. 4B show a communication method of an MTC terminal with low power consumption and a wireless network according to a third embodiment of the present invention. Difference between this embodiment and the third embodiment is that: step 304, step 305 and step 306 are replaced with step 404, step 405 and step 406 shown in FIG. 4A and FIG. 4B.

Step 404: According to an uplink packet transmission resource indicated in the immediate assignment message, the MTC terminal sends a unique identifier and possible service data by using an MTC data report message.

Step 405: The BSC of the wireless network processes, by using a certain entity, the MTC data report message from the MTC terminal, and repeatedly sends an MTC device control message to the MTC terminal at least twice.

Step 406: The MTC terminal receives any one of the device control messages, and performs a corresponding operation according to a command carried in the message; and then the MTC terminal enters an idle mode.

Unlike the third embodiment, two or more downlink device control messages need to be sent, thereby improving the transmission reliability of the control messages.

Figure 5A:
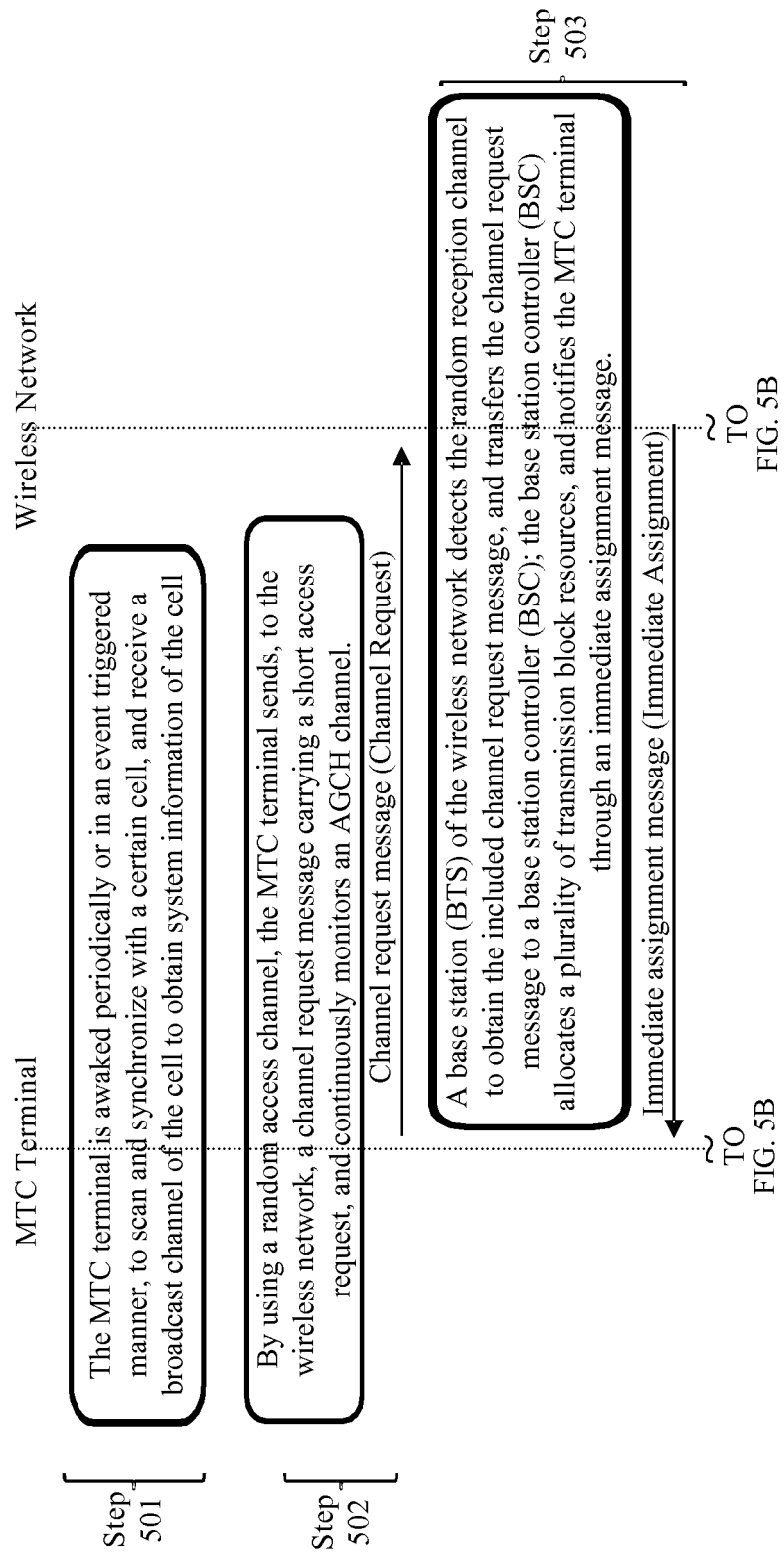
FIG. 5A and FIG. 5B are flow charts of a communication method according to a fourth embodiment.
Figure 5B:
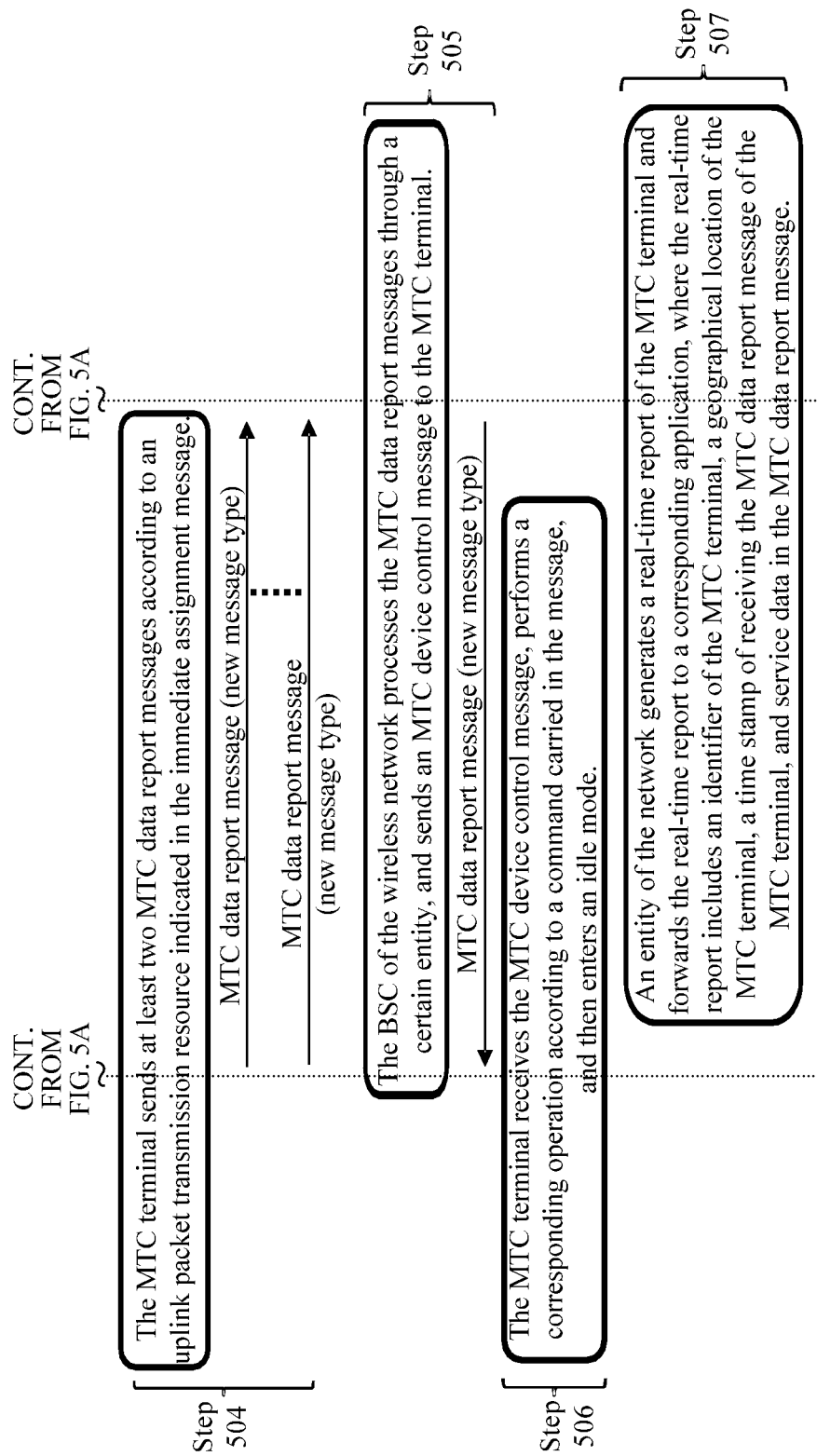

FIG. 5A and FIG. 5B show a communication method of an MTC terminal with low power consumption and a wireless network according to a fourth embodiment of the present invention.

In this embodiment, a data report message from the MTC terminal cannot be carried by the message in step 304 of the second embodiment.

Step 502: By using a random access channel the MTC terminal sends, to the wireless network, a channel request message carrying a short access request, and continuously monitors an AGCH channel.

The channel request message with the short access request indicates the number of transmission data blocks calculated according to service data, and notifies the wireless network of (a maximum of 8) allocated uplink transmission resource blocks; by using these allocated resource blocks, the MTC terminal may send a plurality of data report messages.

Step 503: A base station (BTS) of the wireless network detects the random access channel to obtain the included channel request message, and transfers the channel request message to a base station controller (BSC); the base station controller (BSC) allocates a plurality of transmission block resources, and notifies the MTC terminal by using an immediate assignment message.

Step 504: The MTC terminal sends at least two MTC data report messages according to an uplink packet transmission resource indicated in the immediate assignment message. Afterwards, the MTC terminal continuously monitors a downlink packet channel so as to receive a device control messages.

Unlike the second embodiment, transmission of a real-time message is accelerated by means of transmitting short access data.

Figure 6A:
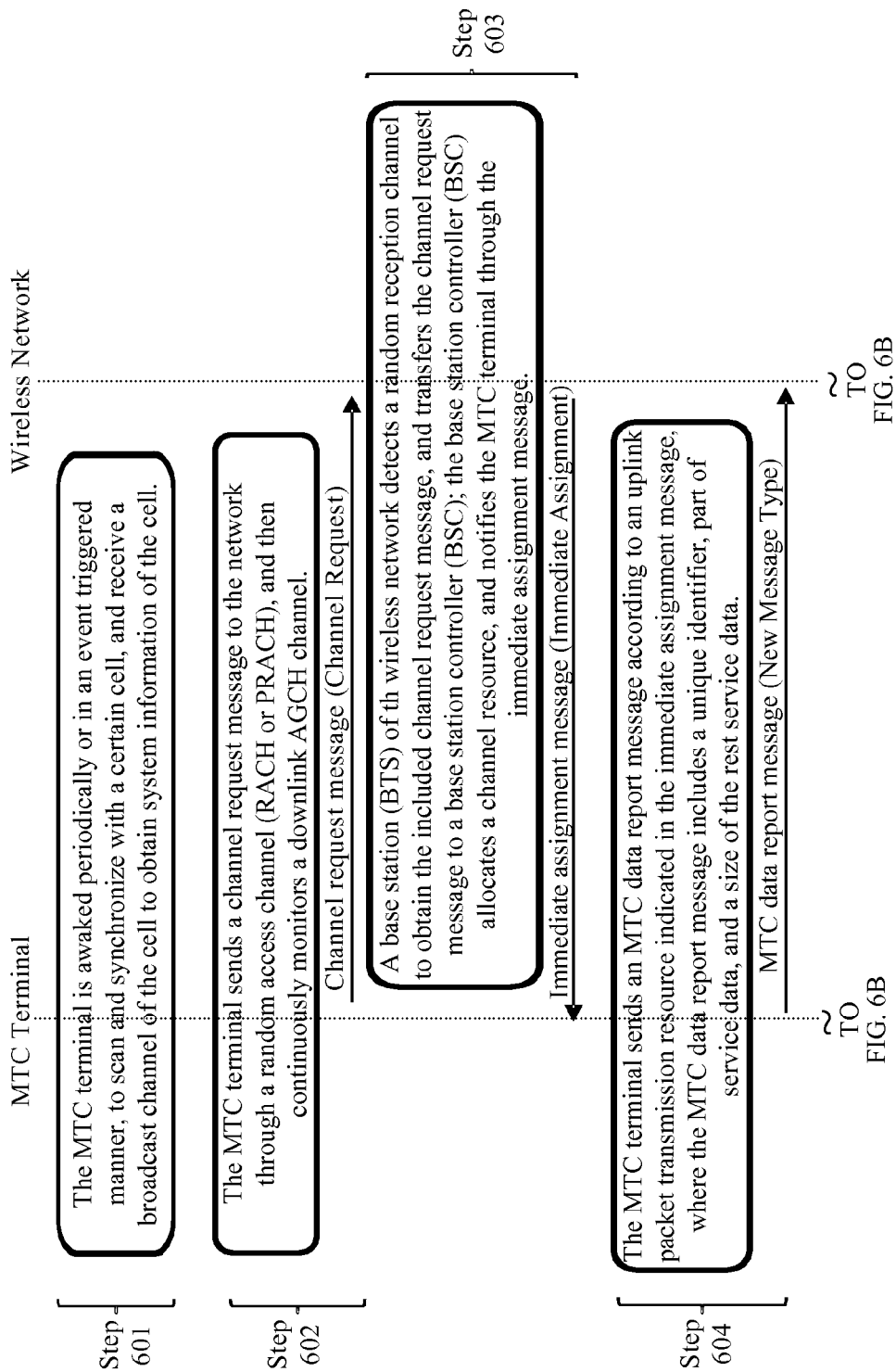
FIG. 6A and FIG. 6B is a flow chart of a communication method according to a fifth embodiment.
Figure 6B:
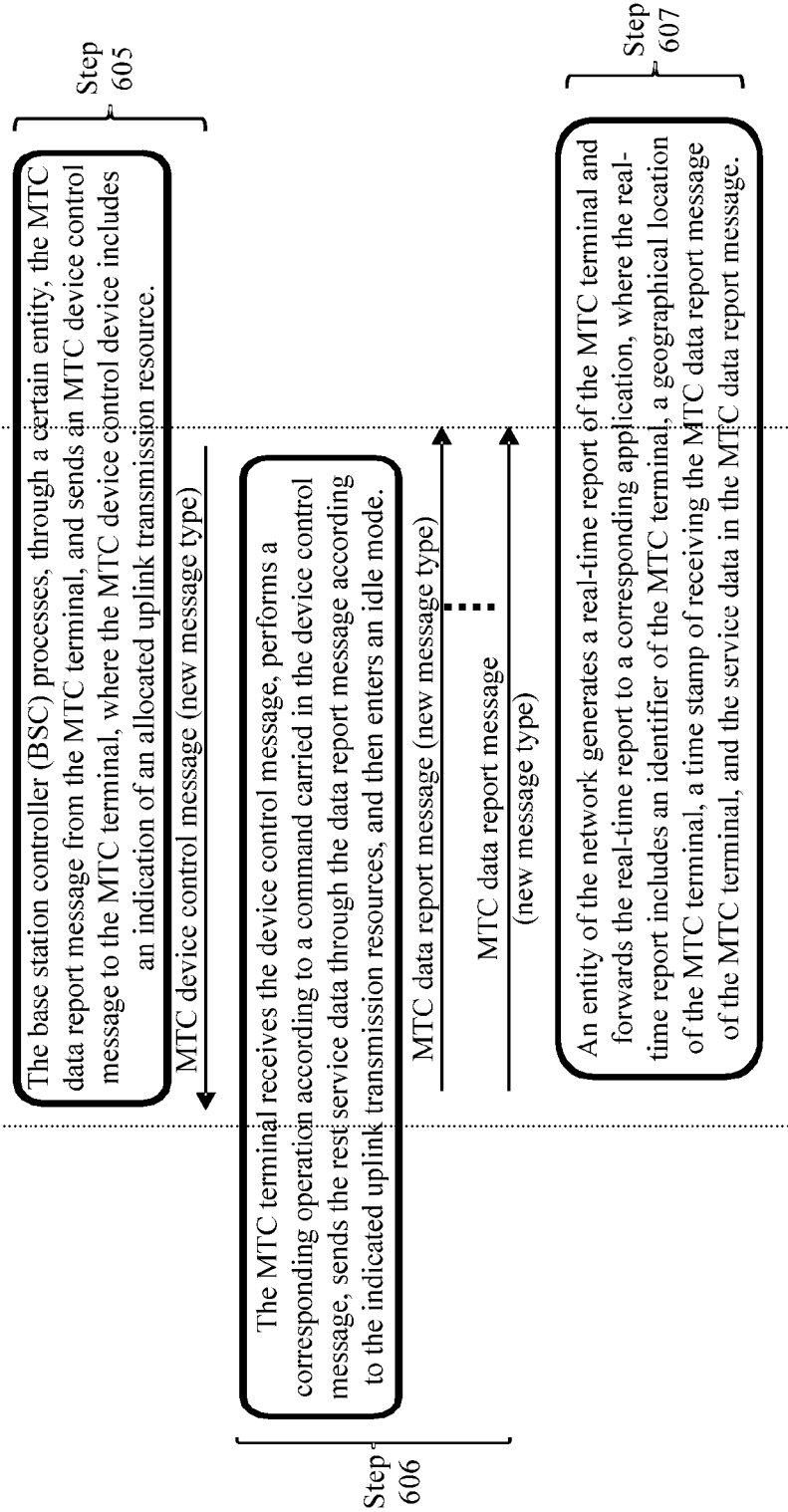

FIG. 6A and FIG. 6B show a communication method of an MTC terminal with low power consumption and a wireless network according to a fifth embodiment of the present invention.

In this embodiment, real-time data of the MTC terminal cannot be carried by the message in step 304 of the second embodiment.

Step 604: The MTC terminal sends an MTC data report message according to an uplink packet transmission resource indicated in the immediate assignment message, where the MTC data report message includes a unique identifier, part of service data, and a size of the rest service data.

Step 605: The base station controller (BSC) processes, by using a certain entity, the MTC data report message from the MTC terminal, and sends an MTC device control message to the MTC terminal, where the message includes information indicating an allocated uplink transmission resource.

Step 606: The MTC terminal receives the device control message, performs a corresponding operation according to a command carried in the message, sends the rest service data by using a data report message according to the indicated uplink transmission resource, and then enters an idle mode.

Unlike the second embodiment, in this embodiment, the MTC device control message carries information indicating an uplink transmission resource, so that when the MTC terminal needs to send lots of service data, transmission time can be shortened.

Figure 7:
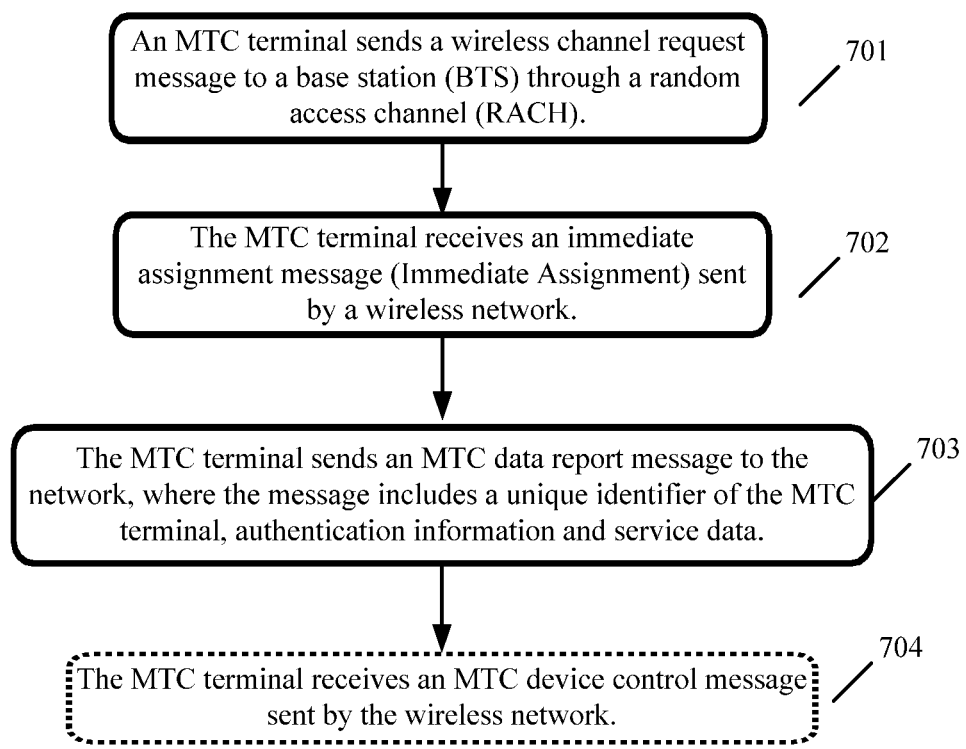
FIG. 7 is a flow chart of a communication method of an MTC terminal with low power consumption according to a sixth embodiment.

FIG. 7 shows a communication method of an MTC terminal with low power consumption according to a sixth embodiment of the present invention, which includes the following steps:

Step 701: The MTC terminal sends a wireless channel request message to a base station (BTS) through a random access channel (RACH);

Step 702: Receive an immediate assignment message (Immediate Assignment) delivered by a wireless network.

Step 703: The MTC terminal sends an MTC data report message to the wireless network, where the MTC data report message includes a unique identifier of the MTC terminal, authentication information and service data.

The unique identifier of the MTC terminal is a number, for example, a 32-bit or 64-bit binary number. The number occupies a variable bit width and is used for uniquely identifying the MTC terminal in the wireless network.

The authentication information is generated by the MTC terminal according to a current time stamp (which may be accurate to minute) and a preset initial code by using a random number method. Correspondingly, at a base station controller (BSC), there is also a set of authentication system, which can verify the authentication information reported by the MTC terminal.

The service data may include particular data (which may be vital signs, depending on the type of the MTC terminal) obtained by the MTC terminal in real time. The MTC terminal may also obtain data through an external interface. The service data may also include wireless environment data detected by the MTC terminal, and the base station controller (BSC) can further accurately locate the MTC terminal according to the wireless environment data.

The MTC data report message may be obtained by extending an existing GSM/EDGE message structure, for example, by changing the value range of one information element therein. In the MTC data report message reported by the MTC terminal, there is a field reserved for the service data.

Preferably, the method further includes the following step: Step 704: Receive an MTC device control message delivered by the wireless network.

The MTC device control message may be obtained by extending an existing GSM/EDGE message structure, for example, by changing the value range of one information element therein. After receiving the MTC device control message, the MTC terminal may also feedback an acknowledgment message.

The MTC device control message sent by the wireless network to the MTC terminal includes a control instruction, for controlling behaviors of the terminal. The MTC terminal receives the MTC device control message, and performs a corresponding operation according to a control command in the MTC device control message, where the operation may be, for example, changing a report period of a message, or stopping working and exiting an MTC service.

The execution steps of the embodiment of the communication method of an MTC terminal in the sixth embodiment of the present invention are in correspondence with those of the MTC terminal in the first embodiment of the present invention. Refer to the implementation manners of the communication methods of an MTC terminal in the second to fifth embodiments of the present invention, where all the implementation manners may be described as embodiments of the communication methods of a terminal.

A seventh embodiment of the present invention describes an MTC terminal with low power consumption, which includes a sending processing unit and a reception processing unit and is configured to execute the steps of the communication method of an MTC terminal with low power consumption in FIG. 7.

The sending processing unit is configured to send a wireless channel request message to a base station (BTS) through a random access channel (RACH).

The reception processing unit is configured to receive an immediate assignment message (Immediate Assignment) delivered by a wireless network.

The sending processing unit is further configured to send an MTC data report message to the wireless network, where the MTC data report message includes a unique identifier of the MTC terminal, authentication information and service data.

The unique identifier of the MTC terminal is a number, for example, a 32-bit or 64-bit binary number. The number occupies a variable bit width and is used for uniquely identifying the MTC terminal in the wireless network.

The authentication information is generated by the MTC terminal according to a current time stamp and a preset initial code by using a random number method. Correspondingly, at a base station controller (BSC), there is also a set of authentication system, which can verify the authentication information reported by the MTC terminal.

The service data may include particular data (which may be vital signs, depending on the type of the MTC terminal) obtained by the MTC terminal in real time. The MTC terminal may also obtain data through an external interface. The service data may also include wireless environment data detected by the MTC terminal, and the base station controller (BSC) can further accurately locate the MTC terminal according to the wireless environment data.

The MTC data report message may be obtained by extending an existing GSM/EDGE message structure, for example, by changing the value range of one information element therein. In the MTC data report message reported by the MTC terminal, there is a field reserved for the service data.

Preferably, the receiving unit is further configured to receive an MTC device control message delivered by the wireless network.

The MTC device control message may be obtained by extending an existing GSM/EDGE message structure, for example, by changing the value range of one information element therein. After receiving the MTC device control message, the MTC terminal may also feed back an acknowledgment message.

The MTC device control message sent by the wireless network to the MTC terminal includes a control instruction, for controlling behaviors of the terminal. The MTC terminal receives the MTC device control message, and performs a corresponding operation according to a control command in the MTC device control message, where the operation may be, for example, changing a report period, or stopping working and terminating an MTC service.

The execution steps of the embodiment of the MTC terminal in the seventh embodiment are in correspondence with those of the MTC terminal in the first and sixth embodiments of the present invention. Refer to the implementation manners of the communication methods of an MTC terminal in the second to fifth embodiments of the present invention, where all the implementation manners may be described as being executed by a sending unit and a receiving unit of a terminal, and also may be used for describing embodiments of a terminal.

Figure 8:
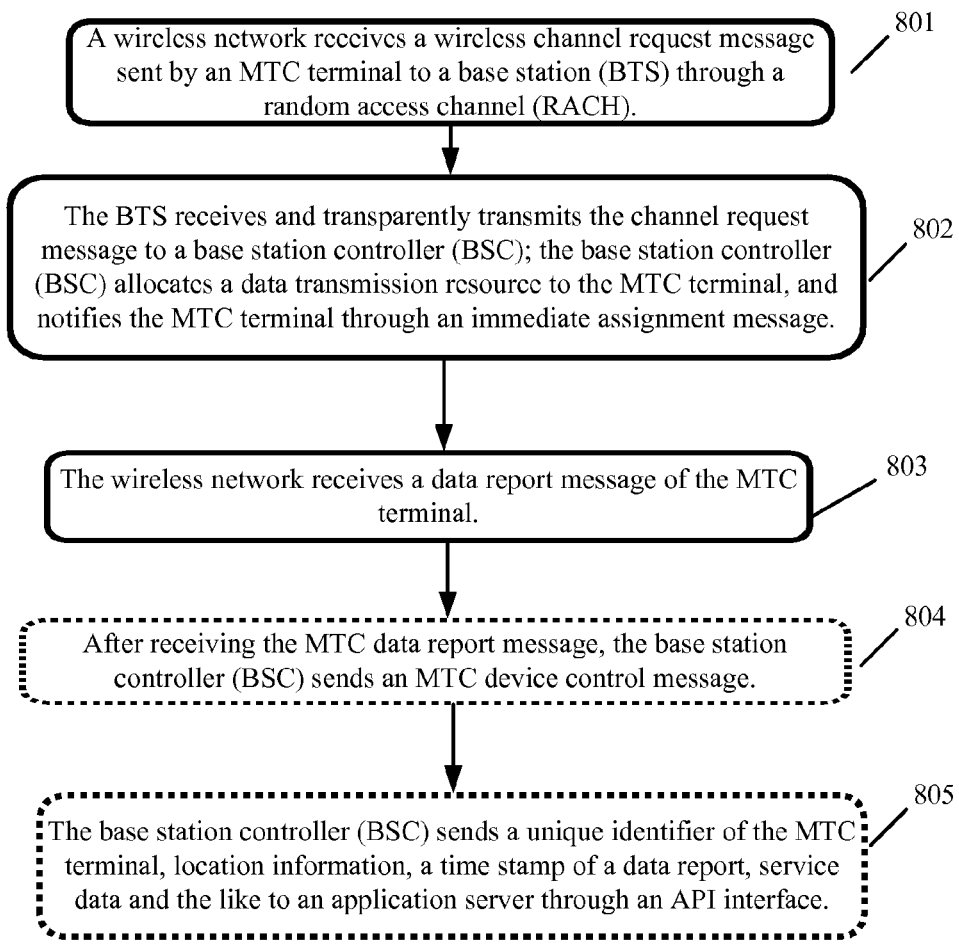
FIG. 8 is a flow chart of a communication method of an MTC wireless network with low power consumption according to an eighth embodiment.

FIG. 8 shows a communication method of an MTC wireless network with low power consumption according to an eighth embodiment of the present invention, which includes the following steps:

Step 801: A wireless network receives a wireless channel request message, which is sent by an MTC terminal to a base station (BTS) through a random access channel (RACH).

Step 802: The base station (BTS) receives and transparently transmits the channel request message to a base station controller (BSC); the base station controller (BSC) allocates a data transmission resource to the MTC terminal, and notifies the MTC terminal by using an immediate assignment message.

Step 803: The wireless network receives a data report message from the MTC terminal.

Preferably, the method further includes the following step: Step 804: After receiving the MTC data report message, the base station controller (BSC) sends an MTC device control message.

Preferably, the method further includes the following step:

Step 805: The base station controller (BSC) sends a unique identifier of the MTC terminal, location information, a time stamp of a data report, and service data to an application server through an API interface.

The application server is configured to manage information reported by the MTC terminal and provide a human-machine interface that can be operated by an administrator. The application server may exist independently or share a physical resource with another server.

The execution steps of the communication method of an MTC wireless network with low power consumption in the eighth embodiment are in correspondence with those of the wireless network in the first embodiment of the present invention. Refer to the implementation manners of a wireless network in the second to fifth embodiments of the present invention, where all the implementation manners may be described as embodiments of a communication method of a wireless network.

Figure 9:
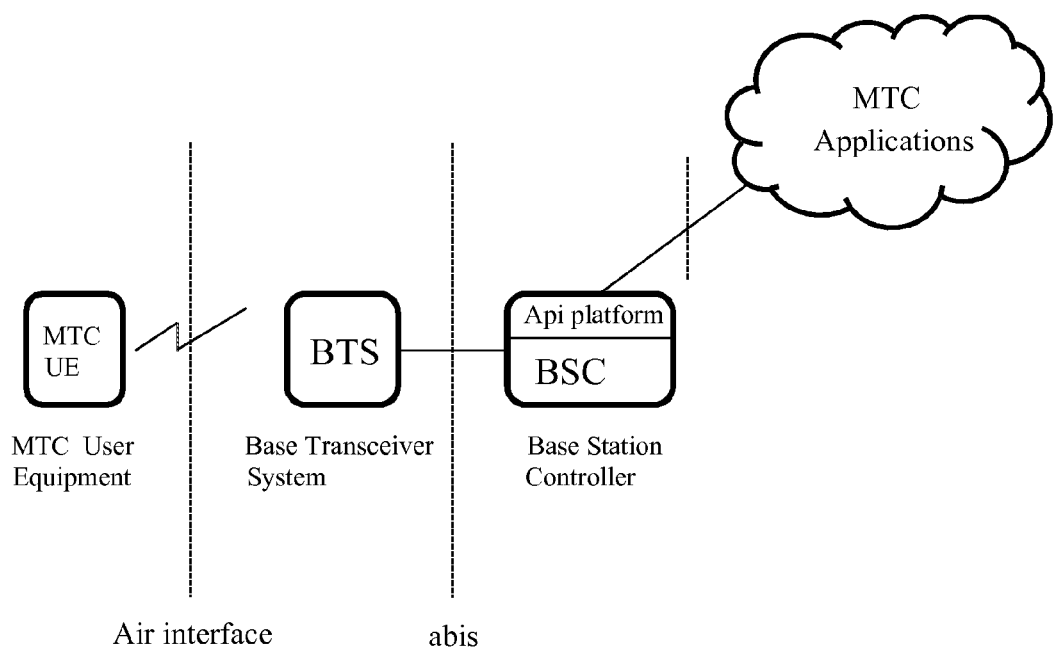
FIG. 9 is a communication system of MTC with low power consumption according to a ninth embodiment.

FIG. 9 shows an MTC wireless network with low power consumption according to a ninth embodiment of the present invention. The wireless network includes a BTS, a BSC and an MTC application server. The BSC includes an API interface module configured to communicate with the MTC application server.

The base station (BTS) is configured to receive a wireless channel request message, which is sent by an MTC terminal through a random access channel (RACH).

The base station (BTS) is configured to receive and transparently transmit the channel request message to a base station controller (BSC); the base station controller (BSC) is configured to allocate a data transmission resource to the MTC terminal, and notify the MTC terminal by using an immediate assignment message.

The wireless network is configured to receive an MTC data report message sent by the MTC terminal, where the MTC data report message includes a unique identifier of the MTC terminal, authentication information and service data.

The unique identifier of the MTC terminal is a number, for example, a 32-bit or 64-bit binary number. The number occupies a variable bit width and is used for uniquely identifying the MTC terminal in the wireless network.

The authentication information is generated by the MTC terminal according to a current time stamp (generally accurate to minute) and a preset initial code by using a random number method. Correspondingly, at the base station controller (BSC), there is also a set of authentication system, which can verify the authentication information reported by the MTC terminal.

The service data may include particular data (which may be vital signs, depending on the type of the MTC terminal) obtained by the MTC terminal in real time. The MTC terminal may also obtain data through an external interface. The service data may also include wireless environment data detected by the MTC terminal, and the base station controller (BSC) can further accurately locate the MTC terminal according to the wireless environment data.

Preferably, the base station controller (BSC) is configured to send an MTC device control message after the MTC data report message is received.

Preferably, the base station controller (BSC) is configured to send the unique identifier of the MTC terminal, location information, a time stamp of a data report, and the service data to the application server through an API interface.

The application server is configured to manage information reported by the MTC terminal and provide a human-machine interface that can be operated by an administrator. The application server may exist independently or share a physical resource with another server.

The execution steps of the MTC wireless network with low power consumption in the ninth embodiment are in correspondence with those of the wireless network in the first and eighth embodiments of the present invention. Refer to the implementation manners of the communication methods of a wireless network in the second to fifth embodiments of the present invention, where all the implementation manners may be described as being executed by the base station BTS, the base station controller BSC and the API interface unit of the BSC, and also may be used for describing embodiments of a wireless network.

A person of ordinary skill in the art should be aware that the unit and arithmetic steps of each example described with reference to the embodiments disclosed in this specification can be implemented by electronic hardware, computer software or a combination of the two. In order to clearly describe the interchangeability of the hardware and the software, compositions and steps of each example have been generally described according to functions in the foregoing description. Whether to execute these functions by using hardware or software is dependent on particular applications and design constraint conditions of the technical solutions. A person skilled in the art may use different methods to implement the described functions for each particular application, but it should not be considered that such an implementation goes beyond the scope of the present invention.

Steps of the methods or algorithms described with reference to the embodiments disclosed in this specification may be implemented by hardware, software modules executed by a processor, or a combination of the two. The software modules may be placed in a random access memory (RAM), memory, a read only memory (ROM), an electronically programmable ROM, an electronically erasable programmable ROM, a register, a hard disk, a removable magnetic disk, a CD-ROM, or a storage medium in any other form known in the art.

Although some embodiments of the present invention have been shown and described, a person skilled in the art should understand that various modifications can be made to these embodiments without departing from the principle and spirit of the present invention, and such modifications shall fall within the scope of the present invention.

What is claimed is:

1. A communication method of a machine type communication (MTC) terminal with low power consumption, comprising:
   sending, by the MTC terminal, a channel request message to a base station (BTS) through a random access channel, and monitoring an absolute grant channel (AGCH) for an immediate assignment message;
   receiving, by the MTC terminal, on the AGCH, after the sending the channel request message, the immediate assignment message sent by a base station controller (BSC); and
   sending, by the MTC terminal, an MTC data report message to the BSC after the MTC terminal receives the immediate assignment message and according to an uplink packet transmission resource indicated in the immediate assignment message, wherein the MTC data report message comprises a unique identifier of the MTC terminal, authentication information and service data, and wherein the authentication information in the MTC data report message includes a random number generated by the MTC terminal according to a current time stamp and a preset initial code.

2. The method according to claim 1, further comprising:
   receiving, by the MTC terminal, an MTC device control message sent by the BSC.

3. The method according to claim 2, further comprising:
   performing, by the MTC terminal, a corresponding operation according to a control command in the MTC device control message; and
   entering an idle mode by the MTC terminal after performing the corresponding operation.

4. The method according to claim 1, wherein the immediate assignment message carries a channel resource allocated by a base station controller.

5. The method according to claim 1, wherein the unique identifier of the MTC terminal is a number.

6. The method according to claim 1, further comprising:
   starting a timer by the MTC terminal after the sending the MTC data report message;
   entering a waiting state by the MTC terminal while the timer is running; and
   entering an idle state by the MTC terminal after the timer expires and in response to no MTC device control message being received at the MTC terminal.

7. The method according to claim 1, wherein the MTC data report message comprises first data and second data, wherein the first data comprises wireless environment data detected by the MTC terminal, and wherein the second data comprises data other than the wireless environment data and that is obtained by the MTC terminal in real time through an external interface.

8. A machine type communication (MTC) terminal with low power consumption, comprising:
   a processor;
   a non-transitory computer readable medium connected to the processor and having stored thereon instructions that, when executed, cause the processor to:
   send a channel request message to a base station (BTS) through a random access channel, and monitor an absolute grant channel (AGCH) for an immediate assignment message;
   receive, on the AGCH, after sending the channel request message, the immediate assignment message sent by a base station controller (BSC); and
   send an MTC data report message to the BSC after the MTC terminal receives the immediate assignment message and according to an uplink packet transmission resource indicated in the immediate assignment message, wherein the MTC data report message comprises a unique identifier of the MTC terminal, authentication information and service data, and wherein the authentication information in the MTC data report message includes a random number generated by the MTC terminal according to a current time stamp and a preset initial code.

9. The terminal according to claim 8, wherein the non-transitory computer readable medium further has stored thereon instructions that, when executed, cause the processor to:
   receive an MTC device control message sent by the BSC.

10. The terminal according to claim 9, wherein the non-transitory computer readable medium further has stored thereon instructions that, when executed, cause the processor to:
    perform a corresponding operation according to the MTC device control message; and
    enter an idle mode after performing the corresponding operation.

11. The terminal according to claim 8, wherein the non-transitory computer readable medium further has stored thereon instructions that, when executed, cause the processor to:
    start a timer after the sending the MTC data report message;
    enter a waiting state while the timer is running; and
    entering an idle state after the timer expires and in response to no MTC device control message being received.

12. The terminal according to claim 8, wherein the MTC data report message comprises first data and second data, wherein the first data comprises wireless environment data detected by the terminal, and wherein the second data comprises data other than the wireless environment data and that is obtained by the terminal in real time through an external interface.

13. A wireless network communication method with low power consumption, comprising:
    receiving, by a base station controller (BSC), a channel request message, which is sent by a machine type communication (MTC) terminal through a random access channel;
    notifying, by the BSC, the MTC terminal, after the receiving the channel request message, by using an immediate assignment message on an absolute grant channel (AGCH), of an uplink packet transmission resource allocated by the BSC; and
    receiving, by the BSC after the notifying the MTC terminal of the uplink packet transmission resource and according to the uplink packet transmission resource, an MTC data report message including a unique identifier of the MTC terminal, authentication information and service data sent from the MTC terminal, wherein the authentication information in the MTC data report message includes a random number generated by the MTC terminal according to a current time stamp and a preset initial code.

14. The method according to claim 13, further comprising:
sending, by the BSC, an MTC device control message which includes a control instruction for controlling behaviors of the MTC terminal after receiving the MTC data report message from the MTC terminal.

15. The method according to claim 13, further comprising:
sending, by the BSC, the unique identifier of the MTC terminal, location information, a time stamp of the MTC data report message, and the service data to an application server through an application interface API.

16. The method according to claim 13, further comprising:
generating, by the BSC, a real-time report of the MTC terminal, and forwarding the real-time report to a related application, wherein the real-time report comprises the unique identifier of the MTC terminal, a geographical location of the MTC terminal, a time stamp of the MTC data report message, and the service data in the MTC data report message.

17. The method according to claim 13, wherein the MTC data report message comprises first data and second data, wherein the first data comprises wireless environment data detected by the MTC terminal, and wherein the second data comprises data other than the wireless environment data and that is obtained by the MTC terminal in real time through an external interface.

* * * * *